US012786329B2

(12) United States Patent
Mikashima et al.

(10) Patent No.: US 12,786,329 B2
(45) Date of Patent: Nov. 3, 2026

(54) IMAGE FORMING APPARATUS

(71) Applicant: KYOCERA Document Solutions Inc., Osaka (JP)

(72) Inventors: Katsuo Mikashima, Osaka (JP); Yuichiro Kurokawa, Osaka (JP); Yasuyuki Fukunaga, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 313 days.

(21) Appl. No.: 18/599,042

(22) Filed: Mar. 7, 2024

(65) Prior Publication Data

US 2024/0305727 A1 Sep. 12, 2024

(30) Foreign Application Priority Data

Mar. 8, 2023 (JP) ................................ 2023-035373

(51) Int. Cl.
*H04N 1/00* (2006.01)

(52) U.S. Cl.
CPC ....... *H04N 1/0061* (2013.01); *H04N 1/00087* (2013.01); *H04N 1/00496* (2013.01); *H04N 1/00588* (2013.01); *H04N 1/00702* (2013.01); *H04N 1/00734* (2013.01); *H04N 1/00933* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 9,850,086 | B2 * | 12/2017 | Smeyers | B65H 5/224 |
| 2022/0086295 | A1 * | 3/2022 | Urase | H04N 1/00084 |
| 2022/0127092 | A1 * | 4/2022 | Yamada | B65H 5/062 |

FOREIGN PATENT DOCUMENTS

| | | | |
|---|---|---|---|
| JP | 2020082517 | A | 6/2020 |

* cited by examiner

*Primary Examiner* — Darryl V Dottin
(74) *Attorney, Agent, or Firm* — Alleman Hall LLP

(57) ABSTRACT

An image reading portion includes a light emitting portion and a plurality of photoelectric conversion elements. The light emitting portion emits detection light to a target area extending over a surface of a conveying belt and a pair of off-belt areas outside the conveying belt in a width direction. The image reading portion outputs a plurality of pixel data items. A reference member forms a pair of boundary lines by the difference in reflectance of the detection light at a pair of reference positions in the pair of off-belt areas. A calibration portion identifies data items corresponding to the pair of boundary lines in the plurality of pixel data items obtained by the image reading portion so as to correct reference position data representing a correspondence relationship between the plurality of pixel data items and positions in the width direction.

6 Claims, 6 Drawing Sheets

IMAGE FORMING APPARATUS

INCORPORATION BY REFERENCE

This application is based upon and claims the benefit of priority from the corresponding Japanese Patent Application No. 2023-035373 filed on Mar. 8, 2023, the entire contents of which are incorporated herein by reference.

The present disclosure relates to an image forming apparatus that detects positions of both ends in the width direction of a conveyed sheet and adjusts a control parameter of a printing device in accordance with the detection result.

BACKGROUND

An image forming apparatus may include a belt conveyor device and a printing device. In this case, the printing device discharges a developer onto a sheet conveyed by the belt conveyor device so as to form an image on the sheet.

In addition, the image forming apparatus may include an image reading portion that reads an image from the sheet conveyed by the belt conveyor device. In this case, it is known that the image forming apparatus forms a test image on the sheet and adjusts a control parameter of the printing device based on image data of the test image obtained by the image reading portion.

SUMMARY

An image forming apparatus according to an aspect of the present disclosure includes a belt conveyor device, a printing device, an image reading portion, a reference member, a calibration portion, and an adjustment portion. The belt conveyor device includes an endless conveying belt, a plurality of support rollers, and a drive portion. The plurality of support rollers rotatably support the conveyor belt. The drive portion rotates one of the plurality of support rollers. The belt conveyor device conveys a sheet on the conveying belt. The printing device forms an image on the sheet by discharging a developer onto the sheet on the conveying belt. The image reading portion includes a light emitting portion and a plurality of photoelectric conversion elements. The light emitting portion emits detection light to a target area extending over a surface of the conveying belt and a pair of off-belt areas outside the conveying belt in a width direction intersecting a sheet conveying direction. The plurality of photoelectric conversion elements are arranged along the width direction, and detect light amounts of reflected light of the detection light from the target area. The image reading portion outputs a plurality of pixel data items representing the light amounts detected by the plurality of photoelectric conversion elements. The reference member is disposed to face the image reading portion and forms boundary lines at a pair of reference positions in the pair of off-belt areas by a difference in reflectance of the detection light. The calibration portion identifies data items corresponding to the pair of boundary lines in the plurality of pixel data items obtained by the image reading portion so as to correct reference position data representing a correspondence relationship between the plurality of pixel data items and positions in the width direction. The adjustment portion derives a pair of lateral edge positions that are positions of both ends of the sheet in the width direction based on the plurality of pixel data items obtained by the image reading portion when the sheet is conveyed by the belt conveyor device and the reference position data, and adjusts a control parameter of the printing device in accordance with a derivation result of the pair of lateral edge positions.

An image forming apparatus according to another aspect of the present disclosure includes the belt conveyor device, a rotation amount detection portion, the printing device, an image reading portion, and an adjustment portion. The rotation amount detection portion detects a rotation amount of one of the plurality of support rollers. The image reading portion includes: a light emitting portion configured to emit detection light to a target area extending along a surface of the conveying belt; and a plurality of photoelectric conversion elements arranged along a width direction intersecting a sheet conveying direction and each configured to detect a light amount of reflected light of the detection light from the target area, and outputs a plurality of pixel data items representing the detected light amounts of the plurality of photoelectric conversion elements. The adjustment portion adjusts a control parameter of the printing device based on the plurality of pixel data items obtained by the image reading portion. The adjustment portion includes a first length deriving portion, a passing period identification portion, a second length deriving portion, and a timing correction portion. The first length deriving portion derives, based on the plurality of pixel data items obtained by the image reading portion when a rectangular specific sheet is conveyed by the belt conveyor device with one specific side of the specific sheet along the width direction, a pair of lateral edge positions that are both end positions of the sheet in the width direction, and derives a length of the specific side of the specific sheet based on a derivation result of the pair of lateral edge positions. The passing period identification portion identifies a sheet passing period from a starting point at which a leading edge of the specific sheet reaches a facing position facing the image reading portion to an ending point at which a trailing edge of the specific sheet reaches the facing position, based on the plurality of pixel data items obtained by the image reading portion when the specific sheet is conveyed by the belt conveyor device in an orientation in which the specific side of the specific sheet is along the sheet conveying direction. The second length deriving portion derives a length of the specific side of the specific sheet based on a rotation amount detected by the rotation amount detection portion during the sheet passing period. The timing correction portion corrects a discharge timing parameter used for controlling a timing of the discharge of the developer by the printing device in accordance with a difference between a derivation result of the first length deriving portion and a derivation result of the second length deriving portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings. It is noted that the following embodiment is an example of embodying the present disclosure and does not limit the technical scope of the present disclosure.

Figure 1:
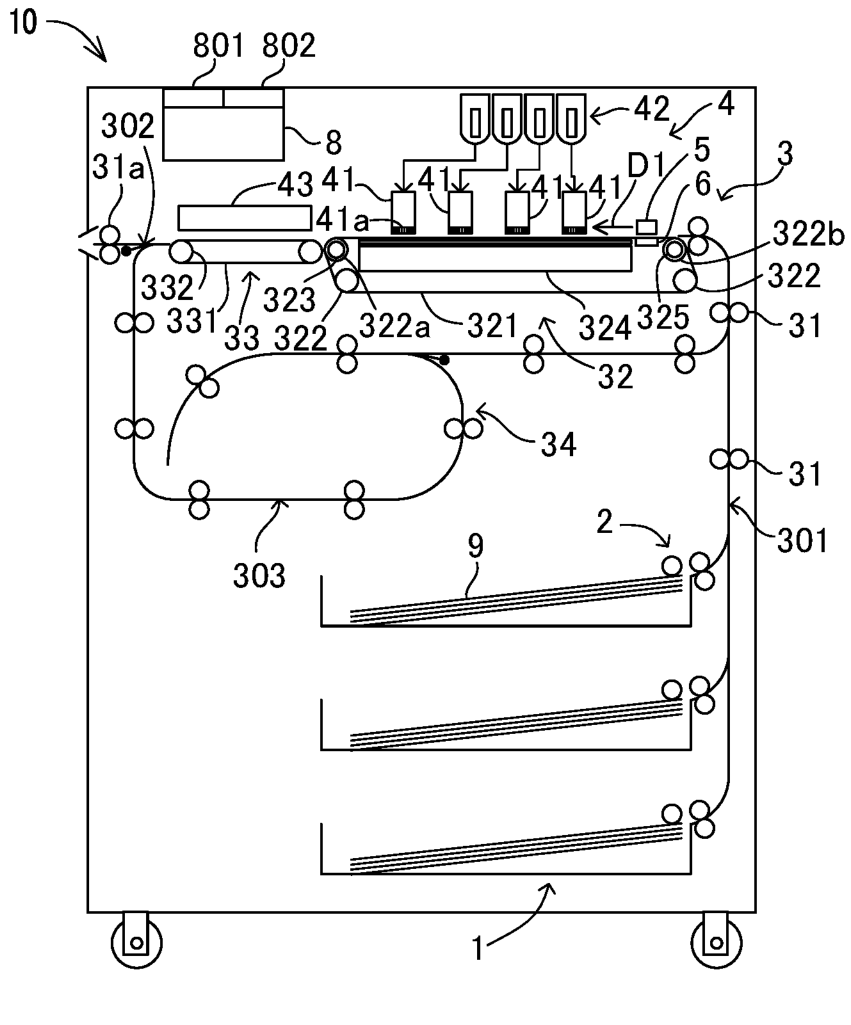
FIG. 1 is a configuration diagram of an image forming apparatus according to an embodiment.

[Configuration of Image Forming Apparatus 10] An image forming apparatus 10 according to the embodiment executes print processing using an inkjet method (see FIG. 1). The print processing is processing for forming an image on a sheet 9. The sheet 9 is a sheet-like image recording medium such as paper or a resin sheet.

As shown in FIG. 1, the image forming apparatus 10 includes a sheet storing portion 1, a sheet feeding mechanism 2, a sheet conveying device 3, and a printing device 4.

The sheet feeding mechanism 2 feeds a sheet 9 in the sheet storing portion 1 to a main conveying path 301. The main conveying path 301 is a passage of the sheet 9.

The sheet conveying device 3 includes a plurality of conveying roller pairs 31, a first belt conveyor device 32, and a second belt conveyor device 33.

Some of the conveying roller pairs 31 convey the sheet 9 along the main conveying path 301, and further send the sheet 9 to the first belt conveyor device 32.

The first belt conveyor device 32 takes over from the plurality of conveying roller pairs 31 to convey the sheet 9, and sends the sheet 9 to the second belt conveyor device 33. The second belt conveyor device 33 takes over from the first belt conveyor device 32 to convey the sheet 9, and further sends the sheet 9 to a post-stage conveying path 302.

Some of the conveying roller pairs 31 convey the sheet 9 along the post-stage conveying path 302, and further send the sheet 9 to a post-stage portion. For example, the post-stage portion is a discharge tray, a post-processing device, or the like.

In addition, in some cases, some of the plurality of conveying roller pairs 31 convey the sheet 9 from the post-stage conveying path 302 to a reverse conveying path 303. The sheet conveying device 3 also includes a reversing mechanism 34 that reverses the sheet 9 in the reverse conveying path 303 and returns the sheet 9 to the main conveying path 301.

The printing device 4 forms an image on the sheet 9 conveyed by the first belt conveyor device 32. The printing device 4 forms an image on the sheet 9 by discharging ink onto the sheet 9.

The ink is an example of the developer.

The printing device 4 includes a plurality of ink heads 41 and a plurality of ink supply portions 42, each corresponding to inks of different colors. Specifically, the printing device 4 includes four ink heads 41 and four ink supply portions 42 corresponding to yellow, magenta, cyan, and black.

Each of the plurality of ink heads 41 includes a plurality of discharge nozzles 41*a* that discharge ink. The plurality of ink heads 41 are fixed at positions facing a conveying belt 321 of the first belt conveyor device 32. The plurality of ink supply portions 42 store inks of different colors and supply the inks to the plurality of ink heads 41, respectively.

The first belt conveyor device 32 conveys the sheet 9 on which an image has been formed to the second belt conveyor device 33.

The printing device 4 forms an image on a first side of the sheet 9 when the sheet 9 is conveyed for the first time by the first belt conveyor device 32. The printing device 4 forms an image on a second side of the sheet 9 when the sheet 9 having passed through the reverse conveying path 303 is conveyed for the second time by the first belt conveyor device 32.

The printing device 4 further includes a drying device 43. The drying device 43 dries the ink on the sheet 9 conveyed by the second belt conveyor device 33. For example, the drying device 43 dries the ink on the sheet 9 by sending warm air to the sheet 9.

The first belt conveyor device 32 includes an endless conveying belt 321, a plurality of support rollers 322, and a motor 323.

The plurality of support rollers 322 rotatably support the conveying belt 321. The motor 323 rotates a drive roller 322*a*, which is one of the plurality of support rollers 322. Thus, the conveying belt 321 rotates following the movement of the drive roller 322*a*. The motor 323 is an example of the drive portion.

The sheet 9 is conveyed onto the conveying belt 321 by some of the plurality of conveying roller pairs 31. The first belt conveyor device 32 conveys the sheet 9 on the conveying belt 321.

The first belt conveyor device further includes a suction device 324 and a rotary encoder 325. A plurality of ventilation holes are formed in the conveying belt 321. The suction device 324 sucks air inside the conveying belt 321, thereby attracting the sheet 9 to the outer surface of the conveying belt 321.

The rotary encoder 325 detects the rotation amount of a detection target roller 322*b*, which is one of the plurality of support rollers 322. The rotary encoder 325 is an example of the rotation amount detection portion.

The rotary encoder 325 outputs one pulse for each unit rotation amount. The number of pulses output from the rotary encoder 325 represents the rotation amount of the detection target roller 322*b*. In addition, the time interval of the output pulses of the rotary encoder 325 represents the rotation speed of the detection target roller 322*b*.

The second belt conveyor device 33 includes an endless conveying belt 331 and a plurality of support rollers 332. The plurality of support rollers 332 rotatably support the conveying belt 331. One of the plurality of support rollers 332 rotates under the power of a drive mechanism (not shown). Thus, the conveying belt 331 rotates, and the second belt conveyor device 33 conveys the sheet 9.

The image forming apparatus 10 further includes an operation device 801, a display device 802, and a control device 8 (see FIG. 1).

The operation device 801 receives human operations. For example, the operation device 801 includes a plurality of operation buttons and a touch panel. The display device 802 can display various types of information. For example, the display device 802 is a panel display device, such as a liquid crystal display panel.

Figure 2:
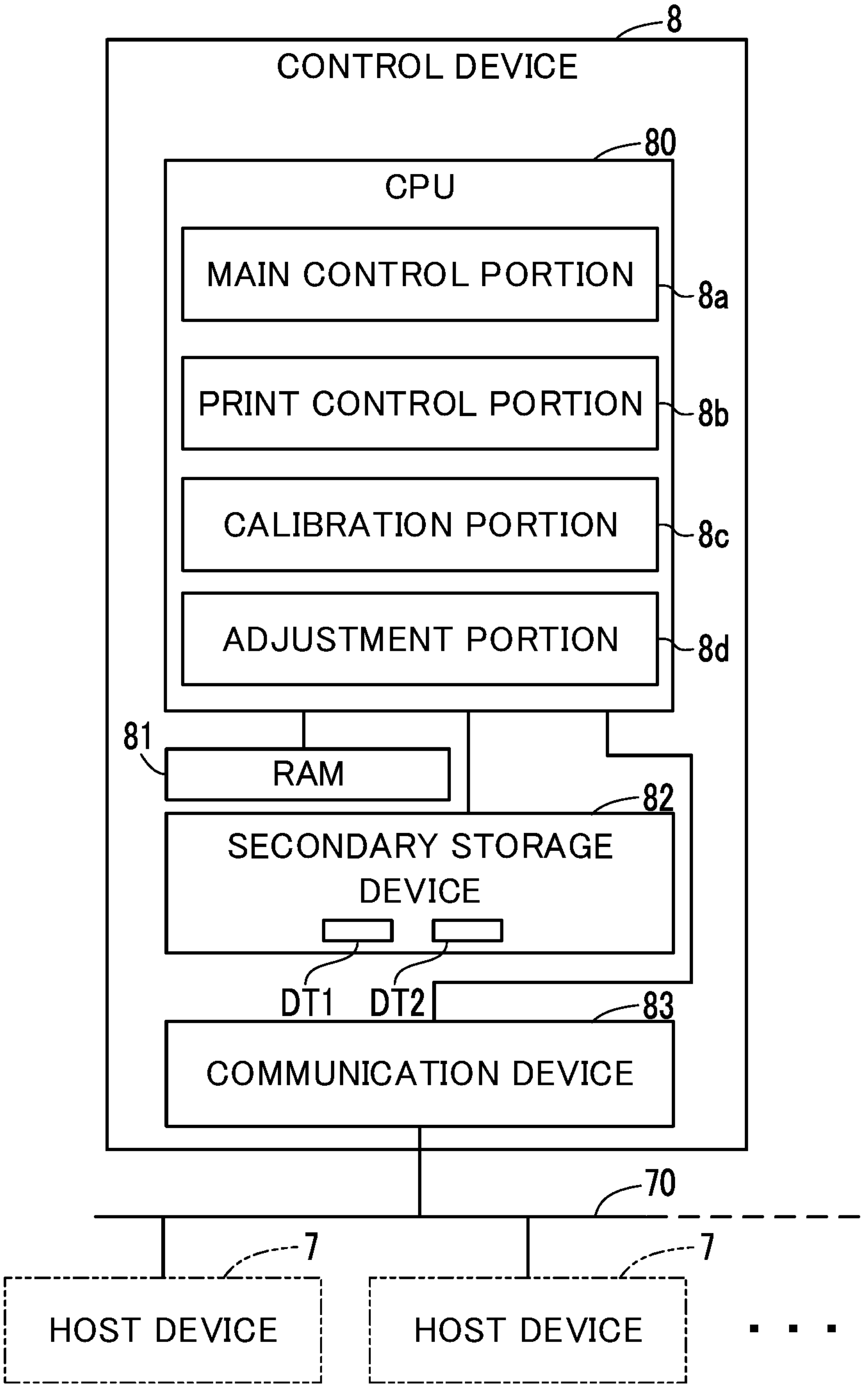
FIG. 2 is a block diagram showing a configuration of a control device in the image forming apparatus according to the embodiment.

As shown in FIG. 2, the control device 8 includes a central processing unit (CPU) 80, a random access memory (RAM) 81, a secondary storage device 82, a communication device 83, and the like.

The CPU 80 executes various types of control and data processing by executing computer programs. The RAM 81 temporarily stores the computer programs executed by the CPU 80 and various types of data.

The secondary storage device 82 is a computer-readable nonvolatile storage device. The secondary storage device 82 stores the computer programs executed by the CPU 80 and various types of data. For example, one or both of a flash memory and a hard disk drive are employed as the secondary storage device 82.

The communication device 83 executes communication with another device, such as a host device 7, through a network 70. The CPU 80 executes communication with another device through the communication device 83. The host device 7 is an information processing device that requests the image forming apparatus 10 to perform the print processing.

The CPU 80 includes a plurality of processing modules implemented by executing the computer programs. The plurality of processing modules include a main control portion 8*a*, a print control portion 8*b*, and the like (see FIG. 2).

The main control portion 8*a* executes start processing for starting various types of processing in response to an operation to the operation device 801 or a processing request received through the communication device 83.

The print control portion 8*b* controls the sheet feeding mechanism 2, the sheet conveying device 3, and the printing device 4. The print control portion 8*b* controls the conveyance of the sheet 9 by controlling the sheet feeding mechanism 2 and the sheet conveying device 3.

Further, the print control portion 8*b* causes the printing device 4 to execute the print processing in synchronization with the conveyance of the sheet 9.

The image forming apparatus 10 further includes an image reading portion 5 that reads an image from the sheet 9 conveyed by the first belt conveyor device 32 (see FIG. 1). The image reading portion 5 is disposed to face the conveying belt 321 of the first belt conveyor device 32. The image reading portion 5 is used to adjust a control parameter.

By the way, in the image forming apparatus 10, it is desirable that ink is not consumed for the adjustment of the control parameter.

Figure 8:
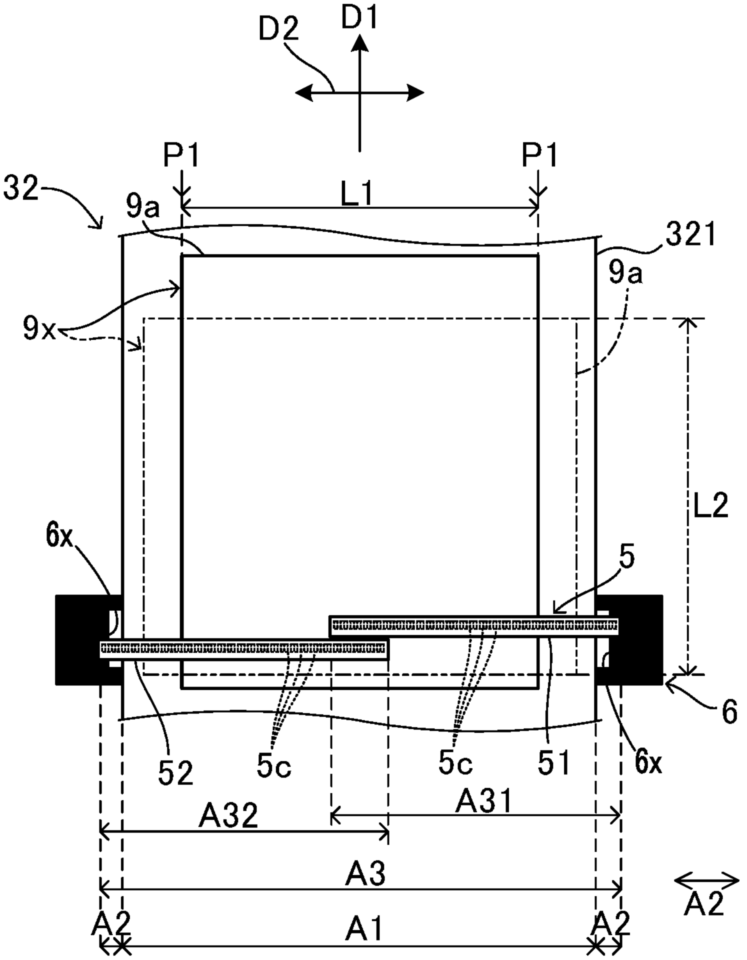
FIG. 8 is a plan view of a part of a belt conveyor device that is conveying a sheet in the image forming apparatus according to the embodiment.

In addition, the image reading portion 5 includes a plurality of photoelectric conversion elements 5*c* arranged in a width direction D2 intersecting a sheet conveying direction D1 (see FIG. 8). In conventional apparatuses, the adjustment of the control parameter is performed on the premise that the accuracy of the positions of the plurality of photoelectric conversion elements 5*c* in the image reading portion 5 is sufficiently high.

On the other hand, when the image forming apparatus 10 is required to output an image of higher quality, the accuracy of the positions of the plurality of photoelectric conversion elements 5*c* may affect the accuracy of the adjustment of the control parameter.

The image forming apparatus 10 has a configuration for adjusting the control parameter with high accuracy without consuming ink for the adjustment of the control parameter. Hereinafter, the configuration will be described.

Figure 3:
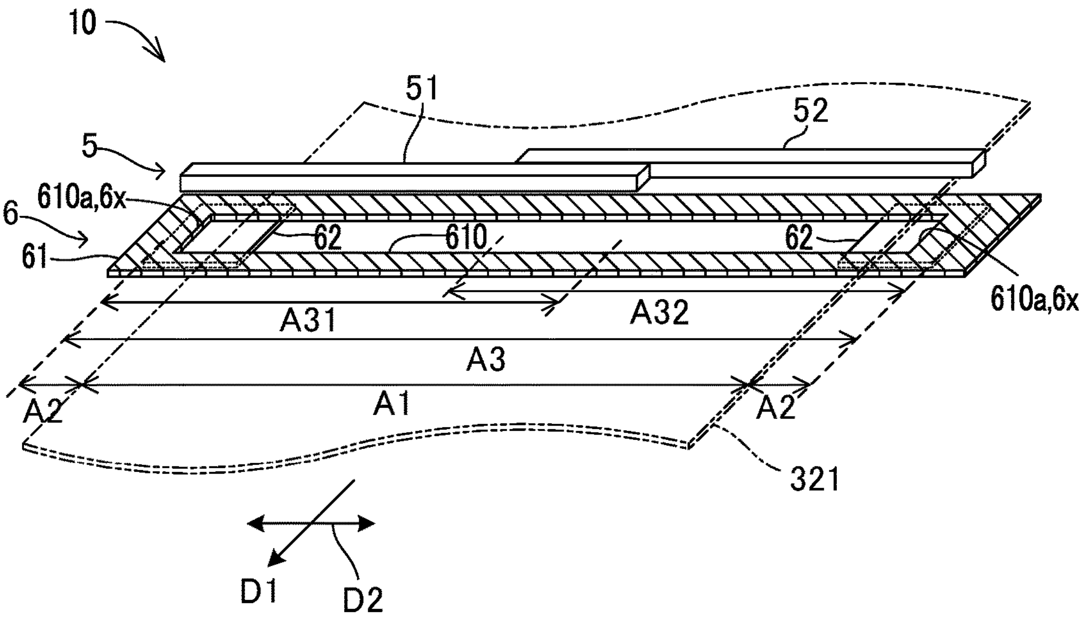
FIG. 3 is a perspective view of an image reading portion and a reference member in the image forming apparatus according to the embodiment.

In the present embodiment, the image reading portion 5 includes two contact image sensor units (CIS units) 51 and 52 (see FIG. 3 and FIG. 8). Hereinafter, one of the two CIS units 51 and 52 will be referred to as a first CIS unit 51, and the other will be referred to as a second CIS unit 52.

In addition, in the following description, the area that the image reading portion 5 faces will be referred to as a target area A3 (see FIG. 3 and FIG. 8). In the present embodiment, the target area A3 is an area extending over a belt area A1 and a pair of off-belt areas A2 in the width direction D2.

The belt area A1 is an area extending along the surface of the conveying belt 321. The pair of off-belt areas A2 are areas outside the conveying belt 321 in the width direction D2.

The first CIS unit 51 is disposed to face a first target area A31, which is a part of the target area A3 (see FIG. 3 and FIG. 8). The first target area A31 is an area continuous from a first end of the target area A3 in the width direction D2.

The second CIS unit 52 is disposed to face a second target area A32, which is a part of the target area A3 (see FIG. 3 and FIG. 8). The second target area A32 is an area continuous from a second end of the target area A3 in the width direction D2.

The second target area A32 is an area different from the first target area A31 in position in the sheet conveying direction D1 and overlapping a part of the first target area A31 in the width direction D2 (see FIG. 3 and FIG. 8).

Figure 5:
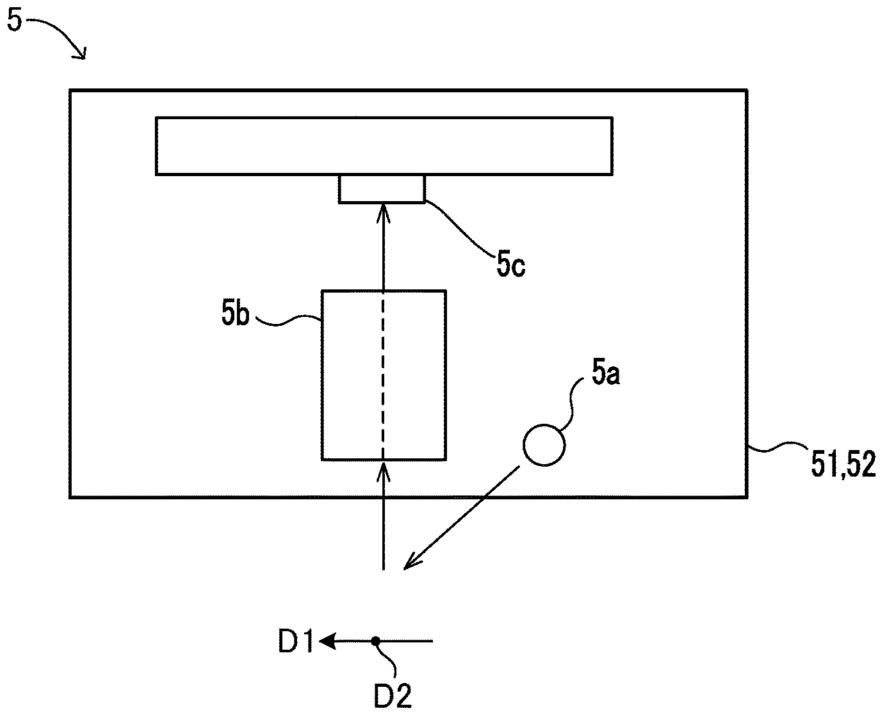
FIG. 5 shows a configuration of a CIS.

Each of the CIS units 51 and 52 includes a light emitting portion 5*a*, a lens 5*b*, and a plurality of photoelectric conversion elements 5*c* (see FIG. 5 and FIG. 8).

The light emitting portion 5*a* of the first CIS unit 51 emits detection light to the first target area A31. The lens 5*b* of the first CIS unit 51 focuses reflected light of the detection light from the first target area A31 to the plurality of photoelectric conversion elements 5*c*.

The light emitting portion 5*a* of the second CIS unit 52 emits the detection light to the second target area A32. The lens 5*b* of the second CIS unit 52 focuses reflected light of the detection light from the second target area A32 to the plurality of photoelectric conversion elements 5*c*.

Each of the CIS units 51 and 52 outputs a plurality of pixel data items representing the amounts of light detected by the plurality of photoelectric conversion elements 5*c*.

That is, the image reading portion 5 emits the detection light to the target area A3 using the light emitting portions 5*a* of the two CIS units 51 and 52. Furthermore, the plurality of photoelectric conversion elements 5*c* of the image reading portion 5 are disposed to face the target area A3, and detect the light amounts of the reflected light of the detection light from the target area A3. The image reading portion 5 outputs the plurality of pixel data items corresponding to the target area A3.

The image forming apparatus 10 further includes a reference member 6 disposed to face the image reading portion 5 (see FIG. 1, FIG. 3, and FIG. 8). The reference member 6 forms a pair of boundary lines 6*x* by the difference in reflectance of the detection light at a pair of reference positions in the pair of off-belt areas A2 by a difference in reflectance of the detection light (see FIG. 3 and FIG. 8).

The pair of reference positions are predetermined positions such that the distance between the pair of reference positions in the width direction D2 is a known reference length.

Figure 4:
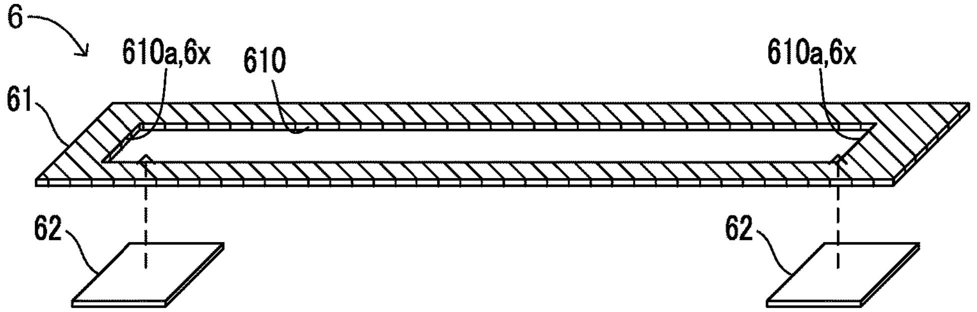
FIG. 4 is an exploded perspective view of the reference member in the image forming apparatus according to the embodiment.

In the present embodiment, the reference member 6 includes a first reference portion 61 having a surface of a first color and a second reference portion 62 having a surface of a second color (see FIG. 3 and FIG. 4). The first color and the second color are selected so that the difference in reflectance of the diffuse reflection of the detection light is as large as possible.

For example, one of the first color and the second color may be black and the other may be white or light yellow. For convenience, the first color is represented by diagonal lines in FIG. 3 and FIG. 4.

The first reference portion 61 is provided with an opening 610 that forms a pair of edges 610*a* along the sheet conveying direction D1 at the pair of reference positions. The second reference portion 62 is disposed to overlap a surface of the first reference portion 61 on the side opposite to the image reading portion 5 side at a portion including the pair of edges 610*a* of the opening 610.

When the reference member 6 is viewed from the image reading portion 5 side, the reflectance of the detection light is greatly different between the inside and the outside of the pair of edges 610*a* of the opening 610. In the reference member 6, the pair of edges 610*a* of the opening 610 in the first reference portion 61 form the pair of boundary lines 6*x*.

As described above, the pair of boundary lines 6*x* are lines formed by the difference in reflectance of the detection light at the pair of reference positions in the pair of off-belt areas A2.

It is noted that the pair of boundary lines 6*x* may be formed by printing on the reference member 6. However, in general, the pair of boundary lines 6*x* can be formed with higher positional accuracy when the first reference portion 61 having the opening 610 is manufactured than when printing is performed on the reference member 6.

In the present embodiment, the plurality of processing modules of the CPU 80 further include a calibration portion 8*c* and an adjustment portion 8*d* (see FIG. 2). The calibration portion 8*c* executes reference data calibration processing to be described later. The adjustment portion 8*d* executes control parameter adjustment processing to be described later.

The reference data calibration processing is processing for correcting reference position data DT1 representing a correspondence relationship between the plurality of pixel data items output by the image reading portion 5 and positions in the width direction D2 (see FIG. 2).

In the image forming apparatus 10, the output positions of a plurality of pixels may be required to be controlled with higher accuracy than the accuracy of the positions of the plurality of photoelectric conversion elements 5*c* guaranteed in each of the two CIS units 51 and 52.

In addition, when the image reading portion 5 includes two CIS units 51 and 52 disposed at different positions in the width direction D2, the accuracy of the disposition of the two CIS units 51 and 52 affects the accuracy of the reference position data DT1.

Therefore, in order to adjust the control parameter with high accuracy, the accuracy of the reference position data DT1 is required to be high. The reference data calibration processing is processing for improving the accuracy of the reference position data DT1.

Figure 6:
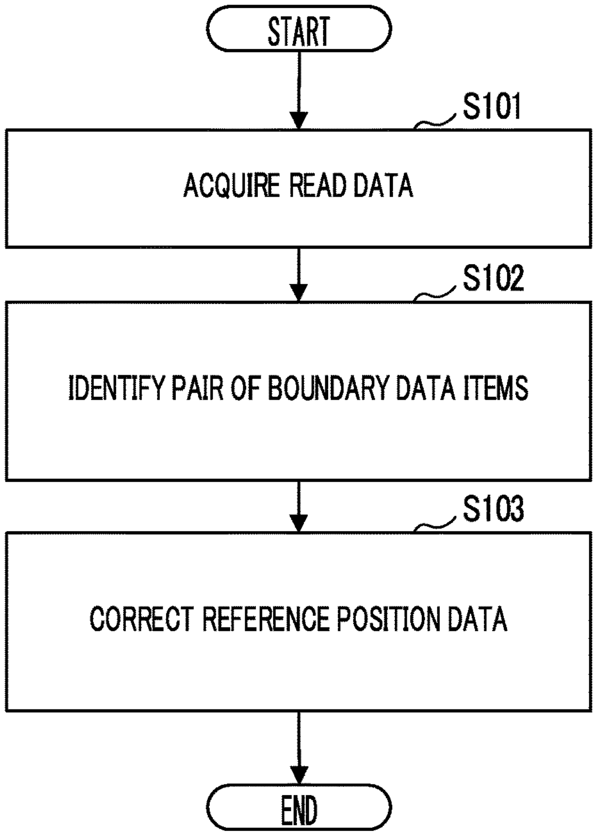
FIG. 6 is a flowchart showing an example of the procedure of reference data calibration processing in the image forming apparatus according to the embodiment.

[Reference Data Calibration Processing] An example of the procedure of the reference data calibration processing will be described below with reference to the flowchart shown in FIG. 6. For example, the calibration portion 8*c* executes the reference data calibration processing when a calibration start operation is performed on the operation device 801.

In the following description, S101, S102, and S103 represent identification codes of a plurality of steps in the reference data calibration processing. The calibration portion 8*c* first executes the process of step S101 in the reference data calibration processing.

<Step S101>

In step S101, the calibration portion 8*c* acquires read data composed of the plurality of pixel data items from the image reading portion 5. The calibration portion 8*c* shifts the processing from step S101 to step S102.

<Step S102>

In step S102, the calibration portion 8*c* identifies a pair of boundary data items corresponding to a pair of boundary lines 6*x* by edge detection processing on the read data. In step S102, the calibration portion 8*c* executes the edge detection processing on a plurality of pixel data items corresponding to the pair of off-belt areas A2 in the read data.

The positions and distance of a pair of reference elements corresponding to the pair of boundary data items among the plurality of photoelectric conversion elements 5*c* correspond to the positions and distance of the pair of boundary lines 6*x*. The calibration portion 8*c* shifts the processing from step S102 to step S103.

<Step S103>

In step S103, the calibration portion 8*c* corrects reference position data DT1 based on the pair of boundary data items. The calibration portion 8*c* updates the reference position data DT1 stored in the secondary storage device 82 to corrected data.

Specifically, the calibration portion 8*c* sets one of the pair of boundary data items as data of a starting point position in the width direction D2 and sets the other of the pair of boundary data items as data of an ending point position in the width direction D2.

The starting point position and the ending point position are positions of the pair of boundary lines 6*x*. The length from the starting point position to the ending point position is the distance between the pair of boundary lines 6*x*.

The calibration portion 8*c* associates a plurality of positions obtained by equally dividing the range from the starting point position to the ending point position by the number of arrays of the plurality of photoelectric conversion elements 5*c* in the width direction D2 with data items other than the pair of boundary data items among the plurality of pixel data items.

The calibration portion 8*c* terminates the reference data calibration processing after executing the process of step S103.

By executing the reference data calibration processing, the reference position data DT1 becomes data that associates the plurality of pixel data items with positions in the width direction D2 with high accuracy.

As described above, the calibration portion 8*c* identifies the pair of boundary data items corresponding to the pair of boundary lines 6*x* among the plurality of pixel data items obtained by the image reading portion 5 (see step S102).

The calibration portion 8*c* corrects the reference position data DT1 by identifying the pair of boundary data items (see step S102 and step S103).

Figure 7:
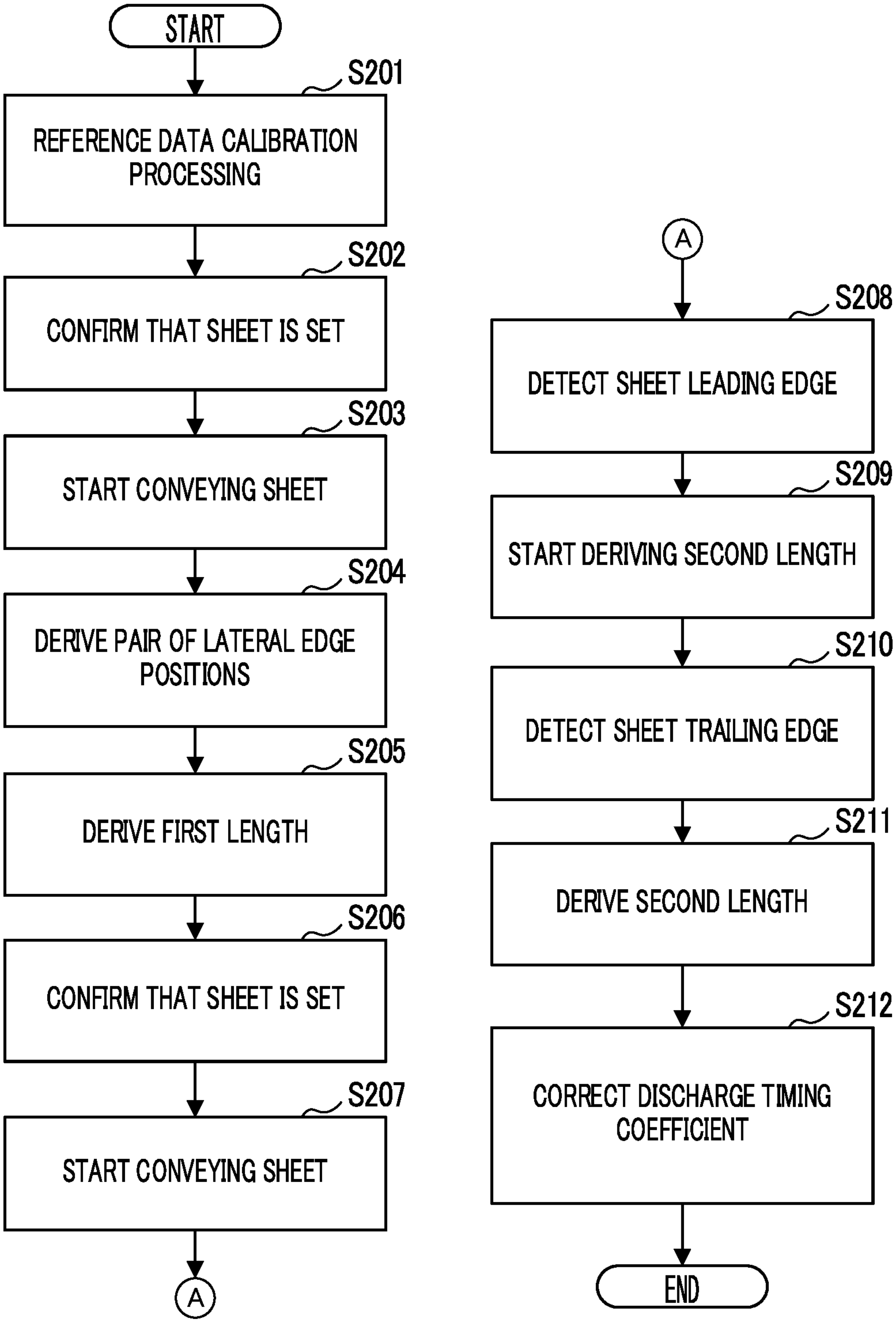
FIG. 7 is a flowchart showing an example of the procedure of control parameter adjustment processing in the image forming apparatus according to the embodiment.

[Control Parameter Adjustment Processing] Next, an example of the procedure of the control parameter adjustment processing will be described below with reference to the flowchart shown in FIG. 7.

The control parameter adjustment processing is an example of processing for adjusting a control parameter of the printing device 4 based on the read data and reference position data DT1.

For example, the adjustment portion 8*d* executes the control parameter adjustment processing when an adjustment start operation is performed on the operation device 801.

In the following description, S201, S202, . . . represent identification codes of a plurality of steps in the control parameter adjustment processing. The adjustment portion 8*d* first executes the process of step S201 in the control parameter adjustment processing.

<Step S201>

In step S201, the adjustment portion 8*d* causes the calibration portion 8*c* to execute the reference data calibration processing.

The adjustment portion 8*d* shifts the processing from step S201 to step S202. The process of step S201 may be omitted on the premise that the reference data calibration processing has been executed in advance.

<Step S202>

In step S202, the adjustment portion 8*d* executes a process of confirming that a rectangular sheet 9 is set in the sheet storing portion 1.

For example, the adjustment portion 8*d* causes the display device 802 to display information for urging the user to set a rectangular sheet 9 in the sheet storing portion 1. Further, the adjustment portion 8*d* confirms that a rectangular sheet 9 is set in the sheet storing portion 1 by detecting a confirmation operation to the operation device 801.

After confirming that a rectangular sheet 9 is set in the sheet storing portion 1, the adjustment portion 8*d* shifts the processing to step S203.

<Step S203>

In step S203, the adjustment portion 8*d* causes the sheet feeding mechanism 2 and the sheet conveying device 3 to start feeding and conveying the sheet 9.

In the following description, the rectangular sheet 9 conveyed in step S203 will be referred to as a specific sheet 9*x* (see FIG. 8). The specific sheet 9*x* is conveyed with a specific side 9*a* of the specific sheet 9*x* along the width direction D2.

In FIG. 8, the specific sheet 9*x* conveyed in the processes of step S202 and step S203 is indicated by a solid line. In the example shown in FIG. 8, the specific side 9*a* of the specific sheet 9*x* is the short side of the specific sheet 9*x*.

The adjustment portion 8*d* shifts the processing from step S203 to step S204.

<Step S204>

In step S204, the adjustment portion 8*d* executes lateral edge position derivation processing. The lateral edge position derivation processing is processing for deriving a pair of lateral edge positions P1 which are positions of both ends of the specific sheet 9*x* in the width direction D2 (see FIG. 8).

The adjustment portion 8*d* derives a pair of lateral edge positions P1 based on the read data obtained by the image reading portion 5 when the specific sheet 9*x* is conveyed by the first belt conveyor device 32 and the reference position data DT1.

Specifically, the adjustment portion 8*d* identifies a pair of edge data items corresponding to both ends in the width direction D2 of the specific sheet 9*x* by the edge detection processing on the read data. In step S204, the adjustment portion 8*d* executes the edge detection processing on a plurality of pixel data items corresponding to the belt area A1 in the read data.

Further, the adjustment portion 8*d* derives, based on the reference position data DT1, the positions in the width direction D2 corresponding to the pair of edge data items as a pair of lateral edge positions P1.

The adjustment portion 8*d* shifts the processing from step S204 to step S205.

<Step S205>

In step S205, the adjustment portion 8*d* derives the distance between the pair of lateral edge positions P1 as a first length L1 (see FIG. 8). The first length L1 is the length of the specific side 9*a* when the specific sheet 9*x* is conveyed with the specific side 9*a* along the width direction D2 (see FIG. 8).

The adjustment portion 8*d* shifts the processing from step S205 to step S206.

<Step S206>

In step S206, the adjustment portion 8*d* executes a process of confirming that the specific sheet 9*x* is set in the sheet storing portion 1 with its orientation changed by 90 degrees.

For example, the adjustment portion 8*d* causes the display device 802 to display information for urging the user to set the specific sheet 9*x* in the sheet storing portion 1 with its orientation changed by 90 degrees. Further, the adjustment portion 8*d* confirms that the specific sheet 9*x* is set in the sheet storing portion 1 with its orientation changed by 90 degrees by detecting a confirmation operation to the operation device 801.

After confirming that the specific sheet 9*x* is set in the sheet storing portion 1 with its orientation changed by 90 degrees, the adjustment portion 8*d* shifts the processing to step S207.

<Step S207>

In step S207, the adjustment portion 8*d* causes the sheet feeding mechanism 2 and the sheet conveying device 3 to start feeding and conveying the specific sheet 9*x*.

By executing the processes of step S206 and step S207, the specific sheet 9*x* is conveyed with the specific side 9*a* along the sheet conveying direction D1. The specific side 9*a* is one of the four sides of the specific sheet 9*x*. In FIG. 8, the specific sheet 9*x* conveyed in the processes of step S206 and step S207 is indicated by a dash-dot-dot-dash line.

The adjustment portion 8*d* shifts the processing from step S207 to step S208.

<Step S208>

In step S208, the adjustment portion 8*d* executes a process of detecting the leading edge of the specific sheet 9*x* conveyed by the first belt conveyor device 32.

Specifically, the adjustment portion 8*d* sequentially acquires the read data from the image reading portion 5, and detects the leading edge of the specific sheet 9*x* when the read data indicates a specific first change.

The adjustment portion 8*d* shifts the processing from step S208 to step S209.

<Step S209>

In step S209, the adjustment portion 8*d* starts to derive a second length L2 from the point of time when the leading edge of the specific sheet 9*x* is detected (see FIG. 8).

The second length L2 is the length of the specific side 9*a* when the specific sheet 9*x* is conveyed with the specific side 9*a* along the sheet conveying direction D1 (see FIG. 8).

Specifically, the adjustment portion 8*d* sequentially selects target coefficients from a plurality of conversion coefficients each time a pulse is output from the rotary encoder 325, and integrates the selected target coefficients to derive the second length L2.

Each of the plurality of conversion coefficients is a coefficient for converting the unit rotation amount of the rotary encoder 325 into the movement amount of the sheet 9 on the conveying belt 321. The number of the plurality of conversion coefficients is the number of pulses output from the rotary encoder 325 in a period of one rotation of the rotary encoder 325.

The plurality of conversion coefficients are set in advance for each rotational position of the rotary encoder 325. The plurality of conversion coefficients are set in advance based on various device characteristics such as the diameter of the detection target roller 322*b* and the thickness of the conveying belt 321.

The adjustment portion 8*d* shifts the processing from step S209 to step S210.

<Step S210>

In step S210, the adjustment portion 8*d* executes a process of detecting the trailing edge of the specific sheet 9*x* conveyed by the first belt conveyor device 32.

Specifically, the adjustment portion 8*d* sequentially acquires the read data from the image reading portion 5, and detects the trailing edge of the specific sheet 9*x* when the read data indicates a specific second change. The second change is a change opposite to the first change.

The adjustment portion 8*d* shifts the processing from step S210 to step S211.

<Step S211>

In step S211, the adjustment portion 8*d* derives the second length L2. That is, the adjustment portion 8*d* terminates the integration of the target coefficients each time a pulse is output from the rotary encoder 325, and determines the derivation result of the second length L2.

The adjustment portion 8*d* shifts the processing from step S211 to step S212.

<Step S212>

In step S212, the adjustment portion 8*d* corrects a discharge timing coefficient DT2 in accordance with the difference between the first length L1 and the second length L2 (see FIG. 2). The discharge timing coefficient DT2 is stored in the secondary storage device 82.

The discharge timing coefficient DT2 is an example of the discharge timing parameter used for controlling the discharge timing of ink by the printing device 4.

The adjustment portion 8*d* terminates the reference data calibration processing after executing the process of step S212.

Here, the time interval between the output pulses of the rotary encoder 325 when the print processing is executed is referred to as a detection pulse interval TP1. In addition, the theoretical value of the cycle of the output pulses of the rotary encoder 325 when the sheet 9 is conveyed at an assumed design speed is referred to as a reference pulse cycle TP0.

Further, the theoretical value of the discharge cycle of ink corresponding to the resolution of the output image in the sheet conveying direction D1 when the sheet 9 is conveyed at the assumed design speed is referred to as a reference discharge cycle TJ1.

For example, the reference discharge cycle TJ1 is selected from a plurality of cycle candidates set in advance for each rotational position of the rotary encoder 325, similarly to the plurality of conversion coefficients. In this case, each of the plurality of cycle candidates is obtained by dividing each of the plurality of conversion coefficients by the assumed speed.

When the print processing is executed, the print control portion 8*b* derives a discharge time interval TJ2 by multiplying the ratio of the detection pulse interval TP1 to the reference pulse cycle TP0 by the reference discharge cycle TJ1. The discharge time interval TJ2 is a time interval of ink discharge by the printing device 4.

The discharge timing coefficient DT2 is a coefficient for correcting the discharge time interval TJ2 when the print processing is executed.

In the present embodiment, the first length L1 is treated as a highly accurate value with respect to the actual length of the specific side 9*a* of the specific sheet 9*x*. By executing the reference data calibration processing, the accuracy of the first length L1 is further improved.

If the plurality of conversion coefficients are consistent with the actual device characteristics of the first belt conveyor device 32, the second length L2 should match the first length L1.

In other words, when the second length L2 matches the first length L1, there is no need to correct the discharge time interval TJ2.

However, uncertain factors such as a dimensional error of a device that calibrates the first belt conveyor device 32 and eccentricity of the detection target roller 322*b* cause a difference between the first length L1 and the second length L2.

Therefore, the adjustment portion 8*d* sets the discharge timing coefficient DT2 according to the difference between the first length L1 and the second length L2. For example, the adjustment portion 8*d* sets the ratio of the second length L2 to the first length L1 as the discharge timing coefficient DT2.

The initial value of the discharge timing coefficient DT2 is 1. Setting the discharge timing coefficient DT2 is an example of the correction of the discharge timing parameter.

The print control portion 8*b* causes the printing device 4 to discharge ink at a time interval obtained by correcting the discharge time interval TJ2 derived based on the reference pulse cycle TP0, the detection pulse interval TP1, and the reference discharge cycle TJ1 with the discharge timing coefficient DT2.

As described above, the adjustment portion 8*d* adjusts the control parameter of the printing device 4 based on the plurality of pixel data items obtained by the image reading portion 5 (see step S202 to step S212).

Specifically, the adjustment portion 8*d* derives a pair of lateral edge positions P1 based on the plurality of pixel data items obtained by the image reading portion 5 when the rectangular specific sheet 9*x* is conveyed in a first orientation by the first belt conveyor device 32 and the reference position data DT1 (see step S202 to step S204).

The first orientation is the orientation of the specific sheet 9*x* when the specific sheet 9*x* is conveyed with the specific side 9*a* of the specific sheet 9*x* along the width direction D2.

Further, the adjustment portion 8*d* adjusts the control parameter of the printing device 4 in accordance with the derivation result of the pair of lateral edge positions P1 (see step S205 to step S212).

Specifically, the adjustment portion 8*d* derives the first length L1 based on the derivation result of the pair of lateral edge positions P1 (see step S205). The adjustment portion 8*d* that executes the processes of step S202 to step S204 is an example of the first length deriving portion that derives the length of the specific side 9*a* of the specific sheet 9*x*.

Further, the adjustment portion 8*d* identifies the sheet passing period based on the plurality of pixel data items obtained by the image reading portion 5 when the specific sheet 9*x* is conveyed in a second orientation by the first belt conveyor device 32 (see step S208 and step S210).

The second orientation is the orientation of the specific sheet 9*x* when the specific sheet 9*x* is conveyed with the specific side 9*a* of the specific sheet 9*x* along the sheet conveying direction D1. The adjustment portion 8*d* that executes the processes of step S208 and step S210 is an example of the passing period identification portion that identifies the sheet passing period.

For example, in step S209 to step S211, the adjustment portion 8*d* causes the image reading portion 5 to detect the light amount of the reflected light at the same time interval as the discharge time interval TJ2 or at a time interval obtained by dividing the discharge time interval TJ2.

Here, the discharge time interval TJ2 is a time interval obtained by correcting the discharge time interval TJ2 derived based on the reference pulse cycle TP0, the detection pulse interval TP1, and the reference discharge cycle TJ1 with the latest discharge timing coefficient DT2. That is, the discharge time interval TJ2 is a time interval of ink discharge corresponding to the discharge timing parameter.

The image reading portion 5 detects the light amount of the reflected light at the same time interval as the discharge time interval TJ2 or at a time interval obtained by dividing the discharge time interval TJ2 in accordance with the control of the adjustment portion 8*d*. Thus, the read data is sampled at a time interval corresponding to the resolution of the output image in the sheet conveying direction D1.

As described above, as the image reading portion 5 operates in synchronization with the discharge time interval TJ2, the number of pixels in the sheet conveying direction D1 correlates with the resolution of the output image. Thus, the second length L2 is derived more accurately.

Further, the adjustment portion 8*d* derives the second length L2 based on the detected rotation amount of the rotary encoder 325 during the sheet passing period (see step S211). The adjustment portion 8*d* that executes the process of step S211 is an example of the second length deriving portion.

Further, the adjustment portion 8*d* corrects the discharge timing coefficient DT2 in accordance with the difference between the derivation result of the first length L1 and the derivation result of the second length L2 (see step S212). The adjustment portion 8*d* that executes the process of step S212 is an example of the timing correction portion that corrects the discharge timing parameter.

By employing the image forming apparatus 10, the control parameter can be adjusted with high accuracy without consuming ink for the adjustment of the control parameter.

APPENDIXES TO DISCLOSURE

The following are appendixes to the overview of the disclosure extracted from the above embodiment. It is noted that the structures and processing functions to be described in the following appendixes can be selected and combined arbitrarily.

Application Example

The pair of lateral edge positions P1 derived in step S204 represent the position of the sheet 9 in the width direction D2.

For example, the adjustment portion 8*d* may correct nozzle correspondence data in accordance with the derivation result of the pair of lateral edge positions P1. The nozzle correspondence data is data representing a correspondence relationship between the X coordinates of the pixels in print image data and the plurality of discharge nozzles 41*a*.

Specifically, the adjustment portion 8*d* derives a pair of lateral edge positions P1 each time the sheet 9 is conveyed by the first belt conveyor device 32. Further, the adjustment portion 8*d* corrects the nozzle correspondence data based on the pair of lateral edge positions P1.

The print control portion 8*b* selects an object which is caused to discharge ink from the plurality of discharge nozzles 41*a* based on the print image data and the corrected nozzle correspondence data. The nozzle correspondence data is an example of the control parameter of the printing device 4.

Appendix 1

An image forming apparatus comprising:

- a belt conveyor device including: an endless conveying belt; a plurality of support rollers configured to rotatably support the conveying belt; and a drive portion configured to rotate one of the plurality of support rollers, and configured to convey a sheet on the conveying belt;
- a printing device disposed to face the conveying belt and configured to form an image on the sheet by discharging a developer onto the sheet on the conveying belt;
- an image reading portion including: a light emitting portion configured to emit detection light to a target area extending over a surface of the conveying belt and a pair of off-belt areas outside the conveying belt in a width direction intersecting a sheet conveying direction; and a plurality of photoelectric conversion elements each disposed to face the target area and configured to detect a light amount of reflected light of the detection light from the target area, and configured to output a plurality of pixel data items representing the detected light amounts of the plurality of photoelectric conversion elements;
- a reference member disposed to face the image reading portion and configured to form a pair of boundary lines at a pair of reference positions in the pair of off-belt areas by a difference in reflectance of the detection light;
- a calibration portion configured to identify data items corresponding to the pair of boundary lines in the plurality of pixel data items obtained by the image reading portion so as to correct reference position data representing a correspondence relationship between the plurality of pixel data items and positions in the width direction; and
- an adjustment portion configured to derive a pair of lateral edge positions that are positions of both ends of the sheet in the width direction based on the plurality of pixel data items obtained by the image reading portion when the sheet is conveyed by the belt conveyor device and the reference position data, and adjust a control parameter of the printing device in accordance with a derivation result of the pair of lateral edge positions.

Appendix 2

The image forming apparatus according to Appendix 1, wherein the image reading portion includes:

- a first contact image sensor unit disposed to face a first target area which is a part of the target area and continues from a first end in the width direction of the target area; and
- a second contact image sensor unit disposed to face a second target area which is a part of the target area and continues from a second end in the width direction of the target area, and the second target area is an area different in position in the sheet conveying direction from the first target area and overlapping a part of the first target area in the width direction.

Appendix 3

The image forming apparatus according to Appendix 1 or Appendix 2, further comprising a rotation amount detection portion configured to detect a rotation amount of one of the plurality of support rollers, wherein the control portion includes:

a first length deriving portion configured to derive the pair of lateral edge positions of a rectangular specific sheet based on the plurality of pixel data obtained by the image reading portion when the specific sheet is conveyed by the belt conveyor device with a specific side of the specific sheet along the width direction and the reference position data and derive a length of the specific side of the specific sheet based on a derivation result of the pair of lateral edge positions;

a passing period identification portion configured to identify a sheet passing period from a starting point at which a leading edge of the specific sheet reaches a facing position facing the image reading portion to an ending point at which a trailing edge of the specific sheet reaches the facing position, based on the plurality of pixel data items obtained by the image reading portion when the specific sheet is conveyed by the belt conveyor device in an orientation in which the specific side of the specific sheet is along the sheet conveying direction;

a second length deriving portion configured to derive a length of the specific side of the specific sheet based on a rotation amount detected by the rotation amount detection portion during the sheet passing period; and a timing correction portion configured to correct a discharge timing parameter used for controlling a timing of the discharge of the developer by the printing device in accordance with a difference between a derivation result of the first length deriving portion and a derivation result of the second length deriving portion.

Appendix 4

The image forming apparatus according to Appendix 3, wherein the image reading portion detects the light amount of the reflected light at a same time interval as a time interval of the discharge of the developer corresponding to the discharge timing parameter or at a time interval obtained by dividing the time interval of the discharge of the developer when a process of the passing period identification portion is executed.

Appendix 5

The image forming apparatus according to any one of Appendix 1 to Appendix 4, wherein the reference member includes:

a first reference portion including a surface of a first color and an opening that forms a pair of edges along the sheet conveying direction at the pair of reference positions; and a second reference portion including a surface of a second color and disposed to overlap a surface of the first reference portion on a side opposite to a side of the image reading portion at a portion including the pair of edges of the opening, and the pair of edges of the opening in the first reference portion forms the pair of boundary lines.

Appendix 6

An image forming apparatus comprising:

a belt conveyor device including: an endless conveying belt; a plurality of support rollers configured to rotatably support the conveying belt; and a drive portion configured to rotate one of the plurality of support rollers, and configured to convey a sheet on the conveying belt;

a rotation amount detection portion configured to detect a rotation amount of one of the plurality of support rollers;

a printing device disposed to face the conveying belt and configured to form an image on the sheet by discharging a developer onto the sheet on the conveying belt;

an image reading portion including: a light emitting portion configured to emit detection light to a target area extending over a surface of the conveying belt and a pair of off-belt areas outside the conveying belt in a width direction intersecting a sheet conveying direction; and a plurality of photoelectric conversion elements disposed to face the target area and configured to detect a light amount of reflected light of the detection light from the target area, and configured to outputs a plurality of pixel data items representing the detected light amounts of the plurality of photoelectric conversion elements; and an adjustment portion configured to adjust a control parameter of the printing device based on the plurality of pixel data items obtained by the image reading portion, wherein the control portion includes:

a first length deriving portion configured to derive, based on the plurality of pixel data items obtained by the image reading portion when a rectangular specific sheet is conveyed by the belt conveyor device with one specific side of the specific sheet along the width direction, a pair of lateral edge positions that are both end positions of the sheet in the width direction, and derive a length of the specific side of the specific sheet based on a derivation result of the pair of lateral edge positions;

a passing period identification portion configured to identify a sheet passing period from a starting point at which a leading edge of the specific sheet reaches a facing position facing the image reading portion to an ending point at which a trailing edge of the specific sheet reaches the facing position, based on the plurality of pixel data items obtained by the image reading portion when the specific sheet is conveyed by the belt conveyor device in an orientation in which the specific side of the specific sheet is along the sheet conveying direction;

a second length deriving portion configured to derive a length of the specific side of the specific sheet based on a rotation amount detected by the rotation amount detection portion during the sheet passing period; and a timing correction portion configured to correct a discharge timing parameter used for controlling a timing of the discharge of the developer by the printing device in accordance with a difference between a derivation result of the first length deriving portion and a derivation result of the second length deriving portion.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a belt conveyor device including: an endless conveying belt; a plurality of support rollers configured to rotatably support the conveying belt; and a drive portion configured to rotate one of the plurality of support rollers, and configured to convey a sheet on the conveying belt;

a printing device configured to form an image on the sheet by discharging a developer onto the sheet on the conveying belt;

an image reading portion including: a light emitting portion configured to emit detection light to a target area extending over a surface of the conveying belt and a pair of off-belt areas outside the conveying belt in a width direction intersecting a sheet conveying direction; and a plurality of photoelectric conversion elements arranged along the width direction and each configured to detect a light amount of reflected light of the detection light from the target area, and configured to output a plurality of pixel data items representing detected light amounts of the plurality of photoelectric conversion elements;

a reference member disposed to face the image reading portion and configured to form a pair of boundary lines at a pair of reference positions in the pair of off-belt areas by a difference in reflectance of the detection light;

a calibration portion configured to identify data items corresponding to the pair of boundary lines in the plurality of pixel data items obtained by the image reading portion so as to correct reference position data representing a correspondence relationship between the plurality of pixel data items and positions in the width direction; and an adjustment portion configured to derive a pair of lateral edge positions that are positions of both ends of the sheet in the width direction based on the plurality of pixel data items obtained by the image reading portion when the sheet is conveyed by the belt conveyor device and the reference position data, and adjust a control parameter of the printing device in accordance with a derivation result of the pair of lateral edge positions.

2. The image forming apparatus according to claim 1, wherein the image reading portion includes:

a first contact image sensor unit disposed to face a first target area which is a part of the target area and continues from a first end in the width direction of the target area; and a second contact image sensor unit disposed to face a second target area which is a part of the target area and continues from a second end in the width direction of the target area, and the second target area is an area different in position in the sheet conveying direction from the first target area and overlapping a part of the first target area in the width direction.

3. The image forming apparatus according to claim 1, further comprising a rotation amount detection portion configured to detect a rotation amount of one of the plurality of support rollers, wherein the adjustment portion includes:

a first length deriving portion configured to derive the pair of lateral edge positions of a rectangular specific sheet based on the plurality of pixel data obtained by the image reading portion when the specific sheet is conveyed by the belt conveyor device with a specific side of the specific sheet along the width direction and the reference position data and derive a length of the specific side of the specific sheet based on a derivation result of the pair of lateral edge positions;

a passing period identification portion configured to identify a sheet passing period from a starting point at which a leading edge of the specific sheet reaches a facing position facing the image reading portion to an ending point at which a trailing edge of the specific sheet reaches the facing position, based on the plurality of pixel data items obtained by the image reading portion when the specific sheet is conveyed by the belt conveyor device in an orientation in which the specific side of the specific sheet is along the sheet conveying direction;

a second length deriving portion configured to derive a length of the specific side of the specific sheet based on a rotation amount detected by the rotation amount detection portion during the sheet passing period; and a timing correction portion configured to correct a discharge timing parameter used for controlling a timing of the discharge of the developer by the printing device in accordance with a difference between a derivation result of the first length deriving portion and a derivation result of the second length deriving portion.

4. The image forming apparatus according to claim 3, wherein the image reading portion detects the light amount of the reflected light at a same time interval as a time interval of the discharge of the developer corresponding to the discharge timing parameter or at a time interval obtained by dividing the time interval of the discharge of the developer when a process of the passing period identification portion is executed.

5. The image forming apparatus according to claim 1, wherein the reference member includes:

a first reference portion including a surface of a first color and an opening that forms a pair of edges along the sheet conveying direction at the pair of reference positions; and a second reference portion including a surface of a second color and disposed to overlap a surface of the first reference portion on a side opposite to a side of the image reading portion at a portion including the pair of edges of the opening, and the pair of edges of the opening in the first reference portion forms the pair of boundary lines.

6. An image forming apparatus comprising:

a belt conveyor device including: an endless conveying belt; a plurality of support rollers configured to rotatably support the conveying belt; and a drive portion configured to rotate one of the plurality of support rollers, and configured to convey a sheet on the conveying belt;

a rotation amount detection portion configured to detect a rotation amount of one of the plurality of support rollers;

a printing device configured to form an image on the sheet by discharging a developer onto the sheet on the conveying belt;

an image reading portion including: a light emitting portion configured to emit detection light to a target area extending along a surface of the conveying belt; and a plurality of photoelectric conversion elements arranged along a width direction intersecting a sheet conveying direction and each configured to detect a light amount of reflected light of the detection light from the target area, and configured to output a plurality of pixel data items representing detected light amounts of the plurality of photoelectric conversion elements; and an adjustment portion configured to adjust a control parameter of the printing device based on the plurality of pixel data items obtained by the image reading portion, wherein the adjustment portion includes:

a first length deriving portion configured to derive, based on the plurality of pixel data items obtained by the image reading portion when a rectangular specific sheet is conveyed by the belt conveyor device with one specific side of the specific sheet along the width direction, a pair of lateral edge positions that are both end positions of the sheet in the width direction, and derive a length of the specific side of the specific sheet based on a derivation result of the pair of lateral edge positions;

a passing period identification portion configured to identify a sheet passing period from a starting point at which a leading edge of the specific sheet reaches a facing position facing the image reading portion to an ending point at which a trailing edge of the specific sheet reaches the facing position, based on the plurality of pixel data items obtained by the image reading portion when the specific sheet is conveyed by the belt conveyor device in an orientation in which the specific side of the specific sheet is along the sheet conveying direction;

a second length deriving portion configured to derive a length of the specific side of the specific sheet based on a rotation amount detected by the rotation amount detection portion during the sheet passing period; and a timing correction portion configured to correct a discharge timing parameter used for controlling a timing of the discharge of the developer by the printing device in accordance with a difference between a derivation result of the first length deriving portion and a derivation result of the second length deriving portion.

* * * * *